(12) United States Patent
Swink et al.

(10) Patent No.: US 6,536,064 B1
(45) Date of Patent: Mar. 25, 2003

(54) FOLDING RAMP WITH PIVOTAL LEG SUPPORT

(75) Inventors: Edward A. Swink, Drexel, MO (US); Clayton M. Smith, Blue Springs, MO (US); Carl L. Murphy, Belton, MO (US); Rick Lavelock, Pleasant Hill, MO (US)

(73) Assignee: ROM Corporation, Belton, MO (US)

( * ) Notice: Subject to any disclaimer, the term of this patent is extended or adjusted under 35 U.S.C. 154(b) by 0 days.

(21) Appl. No.: 09/348,141

(22) Filed: Jul. 6, 1999

(51) Int. Cl.$^7$ ................................................ E01D 1/00
(52) U.S. Cl. ........................................ 14/69.5; 414/537
(58) Field of Search ................................ 14/69.5, 71.1, 14/72.5, 71.7, 71.3, 2.4; 296/61; 414/537

(56) References Cited

U.S. PATENT DOCUMENTS

| | | | |
|---|---|---|---|
| 963,918 A | * | 7/1910 | Miller |
| 2,437,479 A | * | 3/1948 | Price ........................... 414/537 |
| 2,523,723 A | * | 9/1950 | Santee et al. ................ 414/537 |
| 2,595,533 A | * | 5/1952 | Mullen et al. ............... 414/537 |
| 2,670,484 A | * | 3/1954 | Bintliff et al. |
| 2,776,063 A | * | 1/1957 | Larson ......................... 414/537 |
| 2,779,958 A | | 2/1957 | Hodges et al. ................. 14/72 |
| 3,328,818 A | | 7/1967 | Melcher ......................... 14/72 |
| 3,984,891 A | | 10/1976 | Weinmann .................... 14/69.5 |
| 3,999,397 A | | 12/1976 | Albery ............................ 61/48 |
| 4,606,090 A | * | 8/1986 | Beard ........................... 14/72.5 |
| 4,657,233 A | * | 4/1987 | Vroom ......................... 267/155 |
| 4,795,304 A | * | 1/1989 | Dudley |
| 5,160,236 A | * | 11/1992 | Redding et al. ............. 414/537 |
| 5,257,894 A | * | 11/1993 | Grant ........................... 414/537 |
| 5,325,558 A | | 7/1994 | Labreche ..................... 14/69.5 |
| 5,347,672 A | | 9/1994 | Everard et al. .............. 14/69.5 |
| 5,678,984 A | * | 10/1997 | Petersen ...................... 414/537 |
| 5,815,870 A | | 10/1998 | Deutch et al. ............... 14/69.5 |
| 5,938,397 A | | 8/1999 | Schouest ..................... 414/537 |
| 5,947,502 A | | 9/1999 | Kammerzell et al. ....... 280/442 |

* cited by examiner

*Primary Examiner*—Gary S. Hartmann
(74) *Attorney, Agent, or Firm*—Shook, Hardy & Bacon L.L.P.

(57) ABSTRACT

A folding portable ramp is provided that includes a first platform section having a first end and a second end, and a second platform section having a first end and a second end. The first end of the second section is pivotally coupled to the second end of the first platform section, and the second section is adapted to be pivoted relative to the first section. A leg support assembly is coupled to at least one of the first and the second platform sections. The support assembly is adapted to be pivoted between a first position wherein the support assembly is oriented generally parallel to the first and the second sections and a second position wherein the support assembly extends outwardly away from the first or second section.

8 Claims, 5 Drawing Sheets

FOLDING RAMP WITH PIVOTAL LEG SUPPORT

BACKGROUND OF THE INVENTION

The present invention relates to folding ramps. More particularly, the invention is directed to a folding ramp that provides access between two surfaces of different heights, such as from a truck or dock surface to the ground surface.

In the loading and unloading of trucks, a ramp is often used to span the distance from the truck trailer to the ground surface. Similarly, a ramp is also used to span the distance from a dock surface to the ground surface. These ramps allow, for example, the trailer to be unloaded by providing a walking surface from the trailer down to the ground. The surface of the ramp also allows unloading dollies or hand-trucks to be used in unloading the contents of the trailer.

Some truck trailers are specially equipped to transport a variety of items requiring different storage temperatures. For example, truck trailers known as "multi-temp" trailers may be equipped with non-refrigerated, refrigerated and freezer compartments. Each of these compartments must be equipped with an access area for loading and unloading. This access area is typically provided in the form of a door located on the side of the trailer. In most instances, a ramp is used to span the distance from each of the side doors down to the ground surface. In using a ramp to unload these trailers, it is therefore necessary to move the ramp from one side door to another as the various compartments are unloaded. As is known within the art, trailers may also be provided with an access door at the rear of the trailer for loading and unloading.

Prior art ramps used in this environment suffer from a number of drawbacks. In typical prior art ramps, the ramp is a unitary, rigid structure that has a length sufficient to span the distance from the trailer surface to the ground at an angle that allows the trailer to be unloaded safely and comfortably. These prior art ramps are typically equipped with wheels at one end thereof. The wheels allow the ramp to be maneuvered into position. However, the length of these prior art ramps hinders the maneuverability of the ramps, making the relocation of the ramps from door-to-door a cumbersome task.

Moreover, it is often desirable to store a ramp somewhere within the trailer, so that each trailer is equipped with a loading or unloading ramp. The prior art ramps have an overall length that requires that they be stored so that they are oriented longitudinally within the body of the trailer. Therefore, the prior art ramps are stored on the trailer so that they are accessible and removable from a only the rear of the vehicle. In trailers having side access doors, this requires the ramp to be removed from the rear of the trailer and moved to the side access door corresponding to the compartment being unloaded. As noted above, the overall length of these prior art ramps makes this movement somewhat cumbersome.

Yet another drawback to prior art ramps is associated with their length and unitary construction. In these prior art ramps, the ramp in use is supported only at each end, with one end supported by the trailer and the other end supported by the ground surface. Even when made of strong, light-weight materials some deflection of the ramp occurs in use. Obviously, when more weight is placed on the ramp, more deflection occurs. It is desirable, however, to have as little deflection as possible, so that the ramp provides a sturdy and secure surface over which items may be loaded and unloaded.

A prior art ramp has been made that addresses some of the above problems. This prior art ramp is equipped with a generally centrally disposed hinge. This hinge allows the ramp to be folded, effectively dividing the ramp in half for movement of the ramp from door to door, which allows it to be more easily maneuvered. This prior art ramp is also equipped with a leg structure that is fixedly attached adjacent the hinge. The leg structure has a pair of wheels thereon which allow the ramp to be maneuvered into place, after which it may be unfolded. The leg structure thus adds to the maneuverability of the ramp. The leg structure also decreases the deflection experienced by the ramp by providing an additional support in the mid-section of the ramp. This prior art ramp, however, still suffers from a number of drawbacks. For example, the wheels of this ramp are located at the bottom of the leg structure. These wheels remain in contact with the ground surface, even when the ramp is being used. These round wheels, by nature, do not offer as solid a contact point with the ground surface as may be desired. Moreover, while this ramp can be folded in half, the fixed leg structure makes it more difficult to store on the trailer due to its awkward overall shape.

Therefore, an apparatus is needed that overcomes the above drawbacks and disadvantages existing in the prior art.

BRIEF SUMMARY OF THE INVENTION

It is an object of the present invention to provide a ramp that can be easily stored under a truck trailer in a transverse orientation relative to the trailer and close to side access doors of the trailer.

It is another object of this invention to provide a ramp that can be easily maneuvered from one position to another.

It is a object of the invention to provide a ramp that offers increased stability and decreased deflection when in use.

It is yet another object of the invention to provide a ramp with a pivotal leg support structure that can be deployed for maneuvering and use and that can be retracted for storage.

It is still another object of the invention to provide a ramp with a pivotal leg support structure that has retractable wheels therein that may be deployed for maneuvering and retracted when the ramp is being used to load and unload a trailer.

According to the present invention, the foregoing and other objects are attained by a folding portable ramp that includes a first platform section having a first end and a second end, and a second platform section having a first end and a second end. The first end of the second section is pivotally coupled to the second end of the first platform section, and the second section is adapted to be pivoted relative to the first section. A leg support assembly is coupled to at least one of the first and the second platform sections. The support assembly is adapted to be pivoted between a first position wherein the support assembly is oriented generally parallel to the first and the second sections and a second position wherein the support assembly extends outwardly away from the first or second section.

Additional objects, advantages, and novel features of the invention will be set forth in part in the description which follows, and in part will be apparent to those skilled in the practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of this specification and which are to be read in conjunction therewith and in which like reference numerals are used to indicate like parts in the various views.

DETAILED DESCRIPTION OF THE INVENTION

Figures 1, 3, 6:
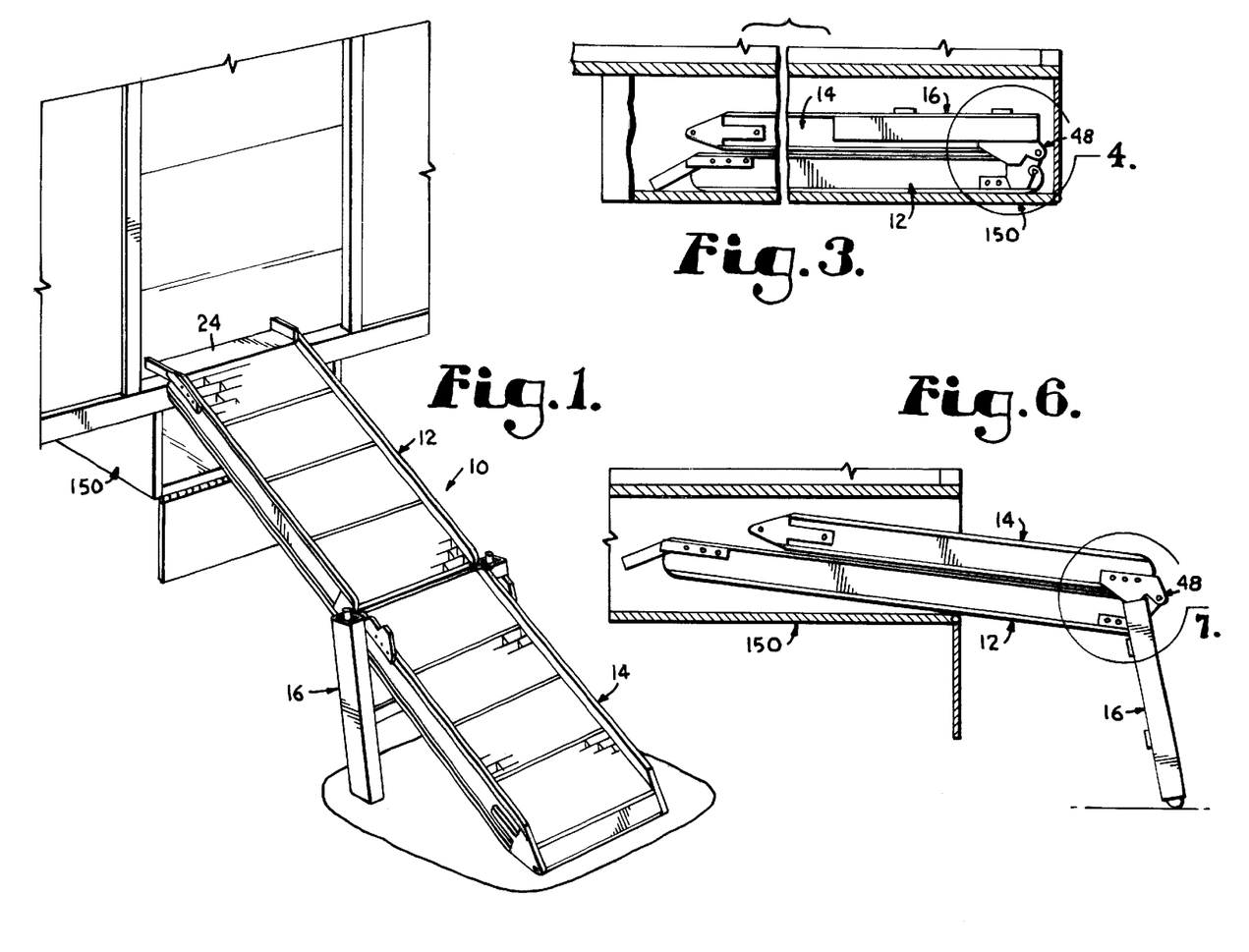
FIG. 1 is a perspective view of the ramp of the present invention, shown in an extended position between an unloading surface of a vehicle and a ground surface.
FIG. 3 is a partial side elevation view of the ramp of FIG. 1, showing the ramp in a stored and folded position.
FIG. 6 is a side elevation view of the ramp of FIG. 1, showing the ramp partially unfolded with the leg support structure in contact with the ground surface.

Referring initially to FIG. 1, a folding ramp according to the present invention is broadly designated in the drawings by the reference numeral 10. Ramp 10 has a first or base section 12 that has a second or wing section 14 and a leg support structure 16 pivotally coupled thereto. As more fully described below, ramp 10 may be manipulated between a storage position, as shown in FIG. 3, and an extended position, as shown in FIG. 1.

Figure 2:
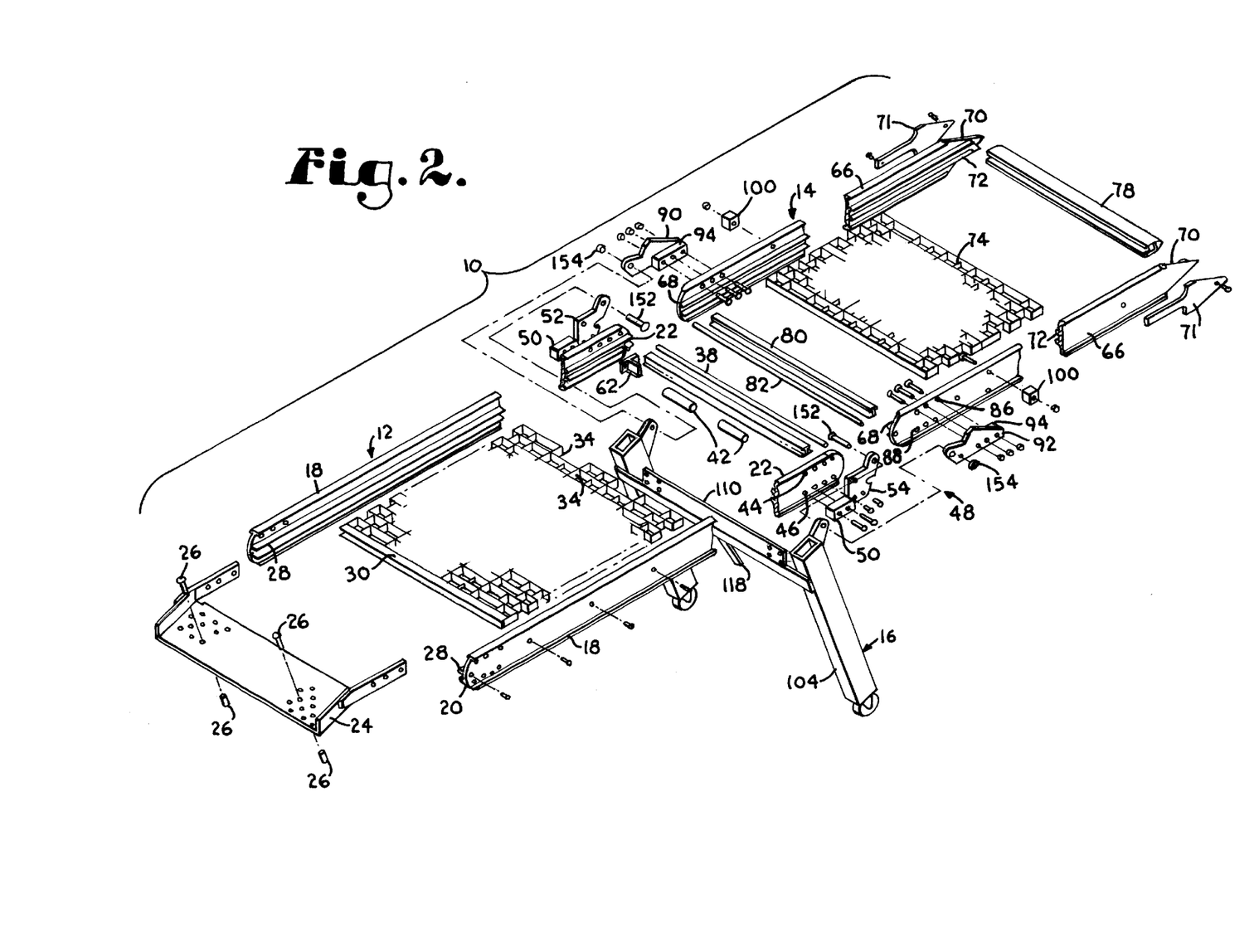
FIG. 2 is an exploded view of the ramp of FIG. 1.
Figure 4:
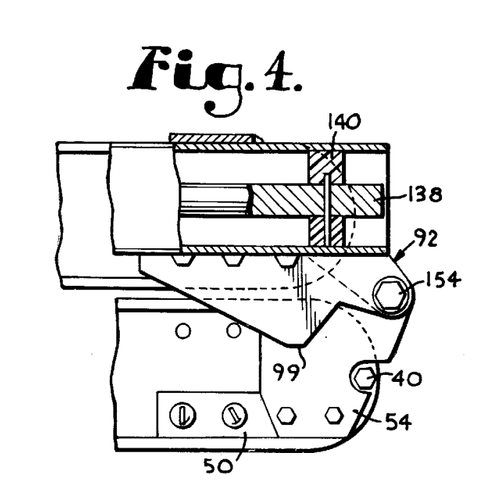
FIG. 4 is an enlarged view of the hinge structure defined by the region of circle 4 in FIG. 3, with parts being broken away to show particular details of construction.

As best seen in FIG. 2, base section 12 includes a pair of elongated channels 18 that extend along each side thereof. Each channel 18 has an apron end 20 and a hinge end 22. A ramp apron 24 is bolted to each channel 18 near end 20. Apron 24 may be bolted in one of two positions, enabling the ramp to be reversed in the event of wear, as is fully described in U.S. Pat. No. 5,815,870 to Deutch et al., the specification of which is hereby incorporated by reference. Ramp 10 is provided with a pair of ramp hooks 26 that may be used to couple apron 24 to the doorway of a truck, thus securing ramp 10 in place.

Projecting inwardly from each channel 18 on base section 12 is a pair of spaced flanges 28. As best seen in FIG. 2, flanges 28 form a channel, within which is placed a series of ramp casting grates 30 and tie rods. Grates 30 and the tie rods are coupled between channels 18 as is described in U.S. Pat. No. 5,815,870. Grates 30 are preferably formed by die-casting magnesium, aluminum or other lightweight metals and alloys. Grates 30 are also preferably of an open construction that allows moisture, debris and other foreign matter to pass through the ramp so as to improve traction of those walking on the ramp. Moreover, grates 30 are formed with gripping nodules that extend outwardly from both the top and bottom surfaces. These gripping nodules provide further traction. By providing nodules on both the top and bottom surfaces, the ramp may be reversed if one surface becomes worn.

Figure 10:
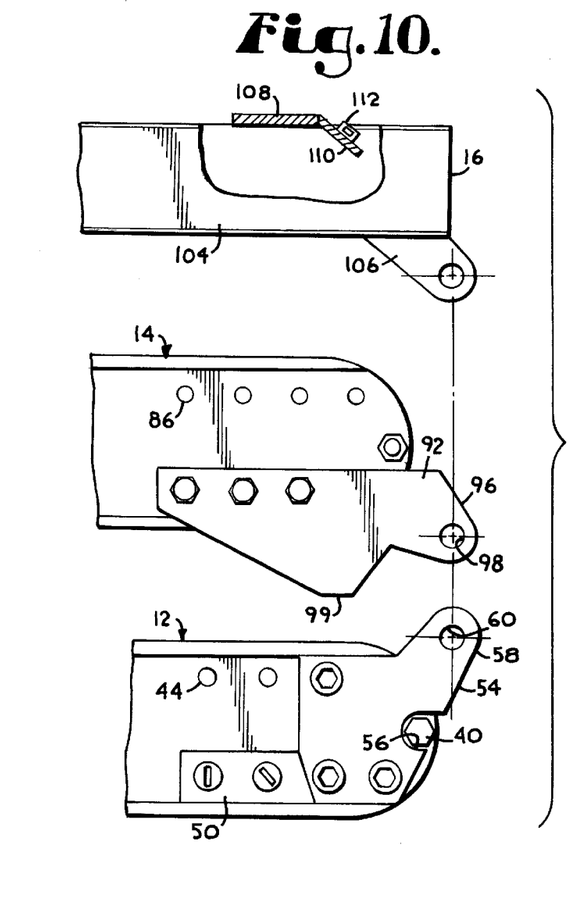
FIG. 10 is a partial side elevation exploded view of the hinge structure of FIG. 4, with parts being broken away to show particular details of construction.

As seen in FIG. 2, grate 30 that is nearest hinge end 22 of base section 12 is of a modified construction that provides a pair of grip openings 34. Openings 34 allow clearance for a person's hand and facilitate removal of ramp 10 from a storage position. Hinge end 22 is further equipped with an end rod 36 that is bolted between channels 18 using a rod 38 that is threaded along its entire length. Rod 38 is received within a threaded channel that spans the length of end rod 36. Rod 38 is held in place by threading a nut 40, as seen in FIG. 10, on each end thereof after rod 38 has been passed through hinge end 22 of channel 18. A pair of gripping handles 42 are secured to rod 36 and are placed so as to be in alignment with openings 34.

As best seen in FIG. 2, each hinge end 22 has a series of upper hinge holes 44 and a series of lower hinge holes 46 disposed therethrough. Preferably, four such upper and lower holes are provided. Holes 44 and 46 are used to couple a hinge assembly 48 to and between sections 12 and 14, as is more fully described below. Hinge assembly 48 includes a pair of leg stops 50, one of which is bolted to the outside of each channel 18 near hinge end 22. Each stop 50 is bolted to channel 18 using the two lower holes 46 that are nearest apron 24. Assembly 48 further includes a left-hand base hinge 52 and a right-hand base hinge 54. Hinges 52 and 54 are mirror images of one another. As best seen in FIGS. 2 and 10, each hinge 52 and 54 is provided with a series of bolt holes that are used to secure the hinge to channel 18. Preferably, three holes are provided. Each hinge is coupled to its respective channel 18 by passing bolts through the holes in the hinges. As best seen in FIG. 10, bolts are passed through the remaining two lower holes 46 and through one upper hole 44. Each hinge 52 and 54 is further provided with a c-shaped clearance notch 56 that allows clearance for nut 40. As best seen in FIG. 10, each hinge 52 and 54 is provided with an upwardly extending portion 58 that has a pivot hole 60 extending therethrough.

Figures 9, 12, 13, 14:
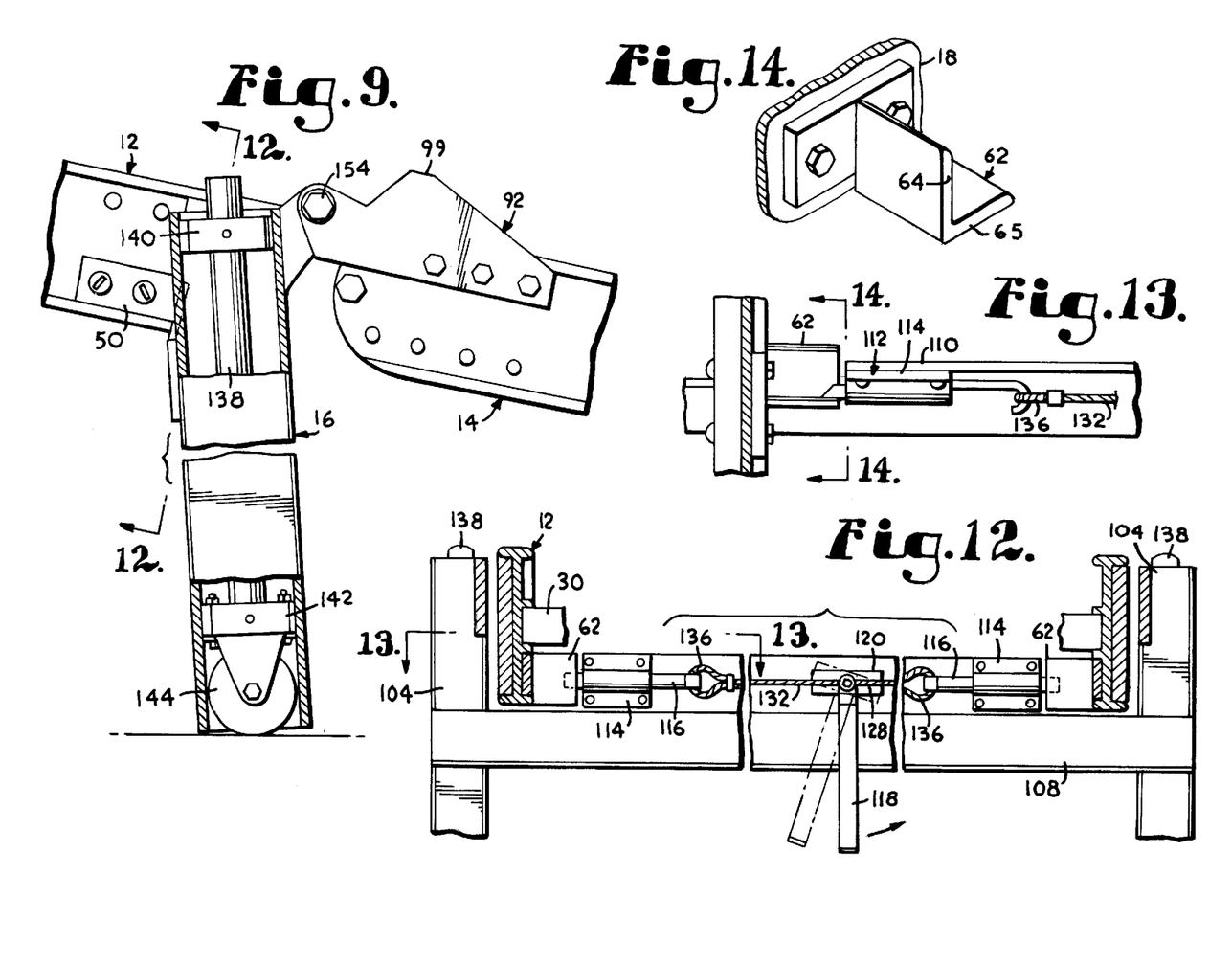
FIG. 9 is a view similar to FIG. 7, showing the hinge structure when the wing section is pivoted away from the base section, with parts being broken away to show particular details of construction.
FIG. 12 is a partial cross-sectional view taken along line 12–12 of FIG. 9.
FIG. 13 is a partial cross-sectional view taken along line 13–13 of FIG. 12.
FIG. 14 is a partial cross-sectional view taken along line 14–14 of FIG. 13.

As best seen in FIGS. 2, 13 and 14, a catch 62 is bolted to the inside surface of each channel 18 on hinge end 22 in alignment with the two lower holes in hinges 52 and 54, respectively. The same lower bolts that are used to secure the hinges to channels 18 are used to secure the catches to the inside surface of the channels. Each catch 62 has an outwardly extending vertical wall 64 and an outwardly extending horizontal wall 65 that cooperate with a latch on the leg structure to hold the legs in an extended position, as is more fully described below. Walls 64 and 65 may be provided by welding a piece of angle iron to a piece of flat steel stock.

As described above, ramp 10 also includes a wing section 14 that is pivotally coupled to base section 12. Wing 14 can be pivoted between a stored position, as shown in FIG. 3, and an extended position, as shown in FIG. 1. As best seen in FIG. 2, wing 14 has a pair of elongated channels 66 that are similar in construction to channels 18. Each channel 66 has a hinge end 68 and a tapered end 70. Each tapered end 70 has a wear plate 71 bolted thereto to reinforce end 70 and provide additional strength thereto. As with channels 18, each channel 66 has a pair of spaced, inwardly extending channel flanges 72 that extend from end 68 to end 70. Flanges 72 are similar in construction to flanges 28, and are similar to those more fully described in U.S. Pat. No. 5,815,870. Flanges 72 support a plurality of ramp casting grates 74 and tie rods that are similar in all respects to grates 30 and the tie rods of base section 12, respectively. Wing 14 terminates on one end with a transition plate 78 extending between channels 66 adjacent tapered end 70. Plate 78 is tapered on both the top and the bottom to match the shape of each tapered end 70 and is preferably bolted in place to channels 66 and to the last grate 74. The shape of plate 78 allows wing section 14 to be reversed in the event that grates 74 experience wear, with the tapered end facilitating a smooth transition from ramp 10 to the ground surface in either orientation.

As best seen in FIG. 2, the series of grates 74 and the tie rods terminates at hinge end 68 with an end rod 80 that is similar in all respects to rod 36. Rod 80 is placed between channel flanges 72 and a threaded rod 82 is placed within a c-shaped channel in rod 80 and through holes in each channel 66. Rod 82 is thereafter held in place by threading a nut onto each end thereof that extends through each channel 66.

As best seen in FIGS. 2 and 10, each channel 66 adjacent hinge end 68 has a series of upper hinge holes 86 and a series of lower hinge holes 88 disposed therethrough. Preferably, three such upper and lower holes are provided. Holes 86 and 88 are used to couple a part of hinge assembly 48 to and between sections 12 and 14, as is more fully described below. As best seen in FIGS. 2, 9 and 10, assembly 48 includes a left-hand wing hinge 90 and a right-hand wing hinge 92. Hinges 90 and 92 are mirror images of one another. Each hinge 90 and 92 is provided with a series of bolt holes that are used to secure the hinge to channel 66. Preferably, three holes are provided. Each hinge is coupled to its respective channel 66 by passing bolts through one of the sets of holes in the channels. As best seen in FIG. 2 each hinge has a rectangular spacer block section 94 that spaces the remainder of the hinge outwardly away from its respective channel 66. Bolts are passed through the upper hinge holes 86, with the lower hinge holes being left open. In the event that the ramp is reversed, lower hinge holes 88 will be used and upper hinge holes 86 will remain open. As best seen in FIG. 10, each hinge 90 and 92 is provided with an extending portion 96 that has a pivot hole 98 extending therethrough. Further, each hinge 90 and 92 has an extending camming protrusion 99 that extends away from spacer block section 94.

As best seen in FIG. 2, wing section 14 has a damper 100 coupled to each channel 66. Damper 100 is preferably located on the upper portion of channel 66 and is bolted in place. Each channel 66 is provided with an upper and a lower hole for installation of the damper, so that the damper can be repositioned if ramp 10 is reversed. Damper 100 can be made from any of a number of vibration damping materials.

Figure 11:
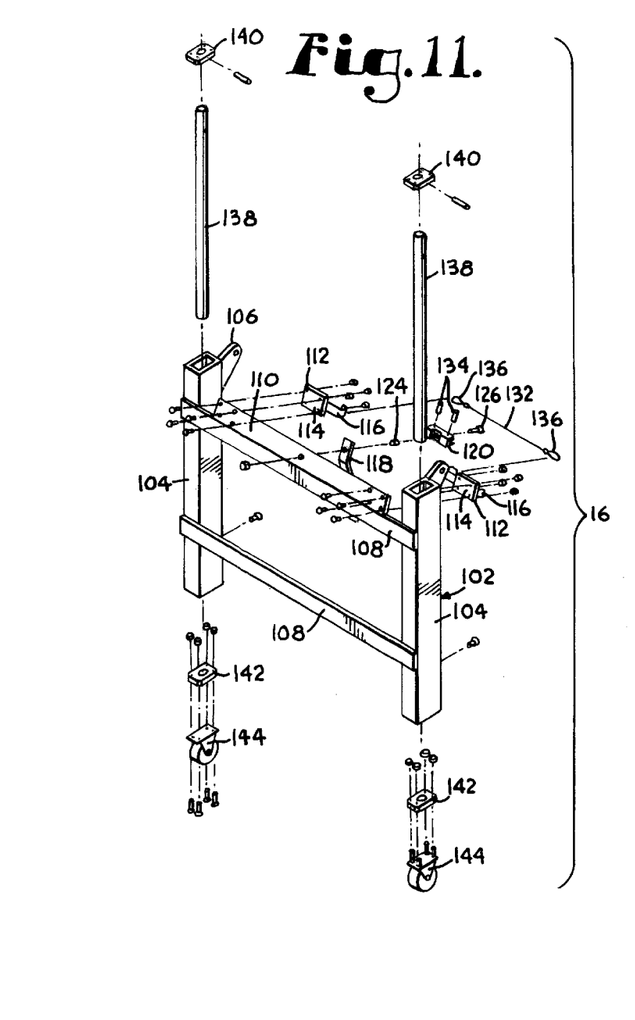
FIG. 11 is an exploded view of the leg support structure of the ramp of FIG. 1.

Leg support structure 16, as best seen in FIGS. 2 and 4–14, is pivotally coupled to both base section 12 and wing section 14. Referring initially to FIG. 11, support 16 includes a leg weldment 102 that has two vertical and hollow leg tubing members 104. Members 104 are preferably made from a square or rectangular steel tubing. Each member 104 has coupled thereto an outwardly and upwardly extending pivot plate 106 that has a pivot hole extending therethrough. As discussed in more detail below, plates 106 are used in cooperation with base hinges 52 and 54 and wing hinges 90 and 92 to couple support 16 to sections 12 and 14. Members 104 are held and supported in a spaced, parallel orientation by a pair of horizontal cross supports 108.

The upper-most support 108 has an additional plate 110 which extends generally between tubing members 104, as best seen in FIG. 11. Plate 110 can be welded to the support 108 at an angle relative to the support. Preferably, however, plate 110 and support 108 are made from one piece of material with plate 110 being bent to the desired angle. As best seen in FIGS. 11 and 13, bolted to each end of plate 110 and extending in the same direction as pivot plates 106 is a finger bolt latch 112. Each latch 112 has a base 114 that is bolted to plate 110. Each base 114 supports a moveable finger 116 that is biased outwardly, such as by a spring. Finger 116 has a curved, j-shaped end on one end thereof and a tapered end on the opposite end, as best seen in FIG. 13.

As seen in FIG. 12, an elongated handle 118 is pivotally mounted generally mid-way between latches 112. Handle 118 has a hole extending through its upper end, through which a bolt is placed. More specifically, a nylon cable pull 120 is placed adjacent handle 118 outermost from plate 110 and a spacer washer is placed between handle 1 18 and plate 110. As best seen in FIG. 11 cable pull 120 has a hole extending through the middle thereof. A bronze bearing 124 is placed in the hole in pull 120 and the hole in handle 118, and a bolt 126 is placed through bearing 124, washer 122 and a hole in plate 110, after which a nut is secured to bolt 126 to hold it in place. Handle 118 is thus mounted to plate 110 so that it can be rotated about bolt 126.

As best seen in FIG. 12, pull 120 has a horizontal groove 128 extending into the body of the pull and across the entire width thereof. A pair of holes extend into the body of pull 120 at a right angle to groove 128. As best seen in FIGS. 11 and 12, a latch cable 132 is placed within groove 128 and is held therein by a pair of retaining pins 134. Cable 132 has a loop 136 on each of its ends. Loop 136 can be formed by positioning the end of cable 132 into a loop and securing it with an aluminum ferrule, as is known in the art. The j-shaped portion of each finger 116 is placed within a corresponding one of the loops 136 as seen in FIGS. 12 and 13. Upon rotation of handle 118, pull 120 will also rotate, causing an inward force to be exerted upon fingers 116 by loops 136. This structure cooperates with catches 62 to releasably retain leg support structure in a deployed position.

Figures 7, 8:
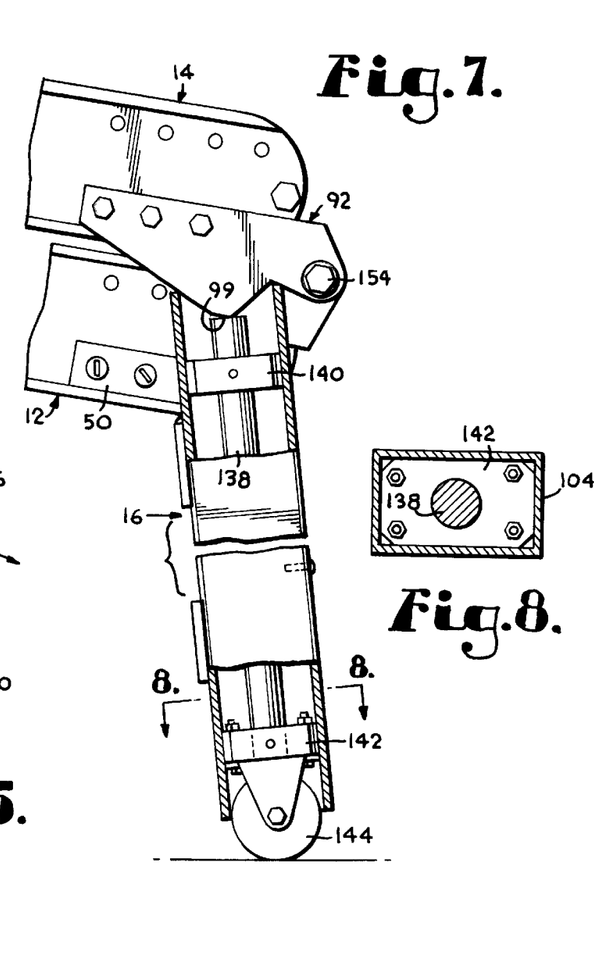
FIG. 7 is a partial enlarged view of the hinge structure defined by the region of circle 7 in FIG. 6, with parts being broken away to show particular details of construction.
FIG. 8 is a cross-sectional view taken along line 8—8 of FIG. 7.

Turning to FIGS. 4–8 and 11, each vertical tubing member 104 is equipped with a retracting wheel assembly. The wheel assembly includes a cylindrical rod 138 that is sized to fit within member 104. An upper guide 140 is secured to the upper end of rod 138 and a lower guide 142 is secured to the lower end of each rod 138. Each guide 140 and 142 is preferably held on rod 138 with a retaining pin arrangement and each is dimensioned to fit within members 104 so that they can freely slide therewithin. To further assist in this sliding movement, the corners of guides 140 and 142 are provided with a chamfer, as best seen in FIG. 8. Guides 140 and 142 may be made from any of a number of materials that do not hinder the intended sliding movement. Each lower guide 142 has a caster 144 coupled thereto, such as with a plurality of bolts. The caster 144 and its associated wheel are dimensioned so that they also fit within hollow member 104, as best seen in FIGS. 7 and 9. Stops may be provided within members 104 to prevent the respective wheel assembly from leaving member 104, such as by a rivet or bolt that would limit the movement of guides 140 and 142.

As noted above, leg support structure 16 is pivotally coupled to both base section 12 and wing section 14. In this coupling, hinges 52 and 54 are bolted to channels 18, and hinges 90 and 92 are bolted to channels 66. A bronze bearing is placed within the pivot holes in pivot plates 108, and a washer is placed on either side of each plate 108. Further, bronze bearings are placed in pivot holes 60 and 98, respectively. Thereafter, as best seen in FIG. 2, a pivot bolt 152 is placed through the bearings and is secured in placed with a nut 154. Bolt 152 thus pivotally secures leg support structure 16, wing section 14 and base section 12 together.

The above assembly allows ramp 10 to be placed in a storage orientation, as best seen in FIG. 3. In this orientation, wing section 14 rests on top of base section 12, and leg support structure 16 rests upon wing section 14. In this orientation, ramp 10 can be stored transversely with respect to the truck trailer, such as in a provided storage compartment 150, shown in FIGS. 1, 3 and 6. This allows the ramp to be stored closer to the side access doors.

Figure 5:
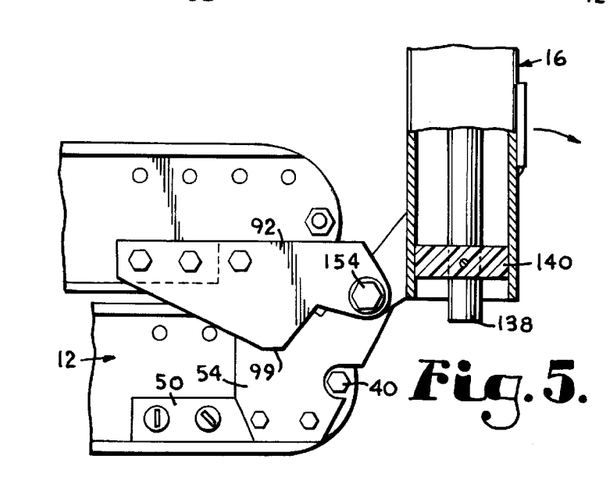
FIG. 5 is a view similar to FIG. 4, showing the leg support structure partially pivoted outward, with parts being broken away to show particular details of construction.

When ramp 10 is needed, it can be removed from its storage position under the trailer. Handles 42 may be grasped by the user to assist in pulling the ramp from under the trailer. The ramp can then be slid from under the trailer to a point that allows clearance for leg support structure 16, such as shown in FIG. 6. Leg support 16 is then rotated away from wing section 14, as shown in FIG. 5, pivoting about bolt 152. Leg support 16 is pivoted to a point where tubing members 104 are generally perpendicular with respect to sections 12 and 14. This point is the point at which tubing member 104 abut leg stops 50. In this orientation, the tapered ends of fingers 116 of latches 112 will engage catches 62, as shown in FIG. 13, thus maintaining leg support structure 16 in the deployed orientation until fingers 116 are released. Further, in this orientation, camming protrusion 99 of hinges 90 and 92 abuts rod 138, positively moving casters 144 beyond tubing members 104, as shown in FIGS. 6 and 7. Therefore, in this orientation, casters 144 are deployed to a useable position. At this stage, ramp 10 may easily be maneuvered to a desired location, using apron 24 as a handle. Casters 144 allow the ramp to be easily moved from one location to another.

Once at the desired access door, apron 24 is placed in contact with the deck of the trailer, and is secured in place with ramp hooks 26. The ramp is then placed in a fully extended and usable position by rotating wing section 14 away from base section 12. As section 14 is rotated, camming protrusion 99 is rotated away from wheel rod 138 so the casters are no longer positively held in a deployed position. Because guides 140 and 142 are free to move within tubing members 104, the weight of the ramp will cause casters 144 to move upwardly relative to members 104 until the casters are located within members 104, as shown in FIG. 9. Thus, as wing section 14 is rotated, casters 144 move within members 104 so that members 104 contact the ground rather than the casters.

Wing section is thereafter rotated until transition plate 78 contacts the ground or unloading surface. When the ramp is to be moved to a new location, wing section 14 is rotated upwardly until it again rests against base section 12. This rotation will again deploy casters 144, as shown in FIG. 7, because protrusion 99 contacts rod 138. After ramp hooks 26 have been removed, the ramp may easily be moved to the new location. When the user is finished using the ramp, wing section 14 is rotated so it rests against base section 12. Apron 24 is then placed within a storage box under the trailer. At this point, leg support 16 is rotated upwardly until it rests on top of wing section 14. To accomplish this rotation, latches 112 must be released from engagement with catches 62. To release latches 112, handle 118 is rotated, which causes cable pull 120 to rotate. This in turn causes an inward force to be imparted to loops 136 in cable 132. As pull 120 is rotated then, fingers 116 of latches 112 are moved inwardly, against the outward bias. As fingers 116 are moved inwardly, the tapered ends thereof will clear catches 62, allowing leg structure 16 to be rotated upwardly into a storage position on top of wing section 14.

Should the grates 30 and 74 become worn, the ramp sections 12 and 14 may be flipped, increasing the overall usable life of the ramp. Multiple mounting holes are provided for ramp apron 24, hinges 52 and 54, hinges 90 and 92 and damper 100 to allow each of these components to be placed in the necessary position once the sections have been flipped. Grates 30 and 74 have gripping nodules on both the top and bottom surfaces thereof, so that either side provides a usable surface.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A folding portable ramp, comprising:
   a first platform section having first and second ends;
   a second platform section having first and second ends, said first end of said second section pivotally coupled to said second end of said first section, and said second section adapted to be pivotally relative to said first section between a storage position wherein said second section overlies said first section and an extended position, wherein said first and second sections from an obtuse angle; and
   a leg support structure pivotally coupled to at least one of said second end of said first section and said first end of second section, said leg structure adapted to be pivoted between a first position, wherein said leg support structure overlies said second section when said second section is in said storage position, and a second position wherein said leg support structure extends outwardly away from said first and second sections;
   and wherein said leg support structure further includes a pair of spaced, generally parallel tubing members, each tubing member having a caster slidingly and retractably mounted therewithin.

2. The folding portable ramp of claim 1, wherein each said caster is coupled to an elongated rod, said rod extending through said tubing member and wherein said leg support structure is coupled to said second section with a pair of hinges, each said hinge having a camming protrusion thereon, said hinge being coupled to said second section so that said protrusion contacts said rod to deploy said caster when said leg structure is in said second position and said second section is in said storage position and so that said protrusion does not contact said rod when said second section is in said extended position so that said caster is free to retract within its respective tubing member when said second section is in said extended position.

3. A folding ramp, comprising:

a first platform section having first and second ends;

a second platform section having first and second ends, said first end of said second section pivotally coupled to said second end of said first section, said second section adapted to be pivoted relative to said first section between a storage position wherein said second section overlies said first section and an extended position, wherein said first and second sections form an obtuse angle;

a leg support structure coupled to at least one of said first section and said second section and extending outwardly therefrom; and a pair of casters, each said caster slidingly coupled with said leg support and adapted to be moved between a deployed position wherein said caster extends beyond said leg support when said second section is in said storage position and a retracted position wherein said caster is substantially within said leg support when said second section is in said extended position.

4. The folding ramp of claim 3, wherein said leg support structure includes a pair of spaced tubing members, each caster being mounted for movement within said members, and wherein each caster is coupled to an elongated rod that extends through its respective said member, said caster being within said tubing member in said retracted position and extending from said member in said deployed position.

5. The folding ramp of claim 4, wherein said leg support structure is coupled to said second section with a pair of hinges, each said hinge having a camming protrusion thereon, said hinge being coupled to said second section with said protrusion contacting said rod when said leg structure is in said second position and said second section is in said storage position to deploy said caster, and said protrusion being spaced from said rod when said second section is in said extended position so that said caster is free to retract within its respective tubing member when said second section is in said extended position.

6. A folding portable ramp, comprising:

a first platform section;

a second platform section pivotally coupled to said first section, said second section adapted to be pivoted relative to said first section between a storage position wherein said second section overlies first section and an extended position, wherein said first and second sections form an obtuse angle; and a leg support structure pivotally coupled to at least one of said first section and second section, said leg support structure adapted to be pivoted between a first position, wherein said leg support structure overlies said second section when said section is in said storage position, and a second position wherein said leg support structure extends outwardly away from said first and second sections;

and wherein said leg support structure includes a pair of spaced tubing members each said tubing member having an associated retractable wheel, each said wheel retracted when said leg support structure is in said second position.

7. The ramp of claim 6, wherein said leg support structure has a latching mechanism coupled thereto that releasably maintains said leg support in said second position.

8. The ramp of claim 7, wherein each wheel is coupled to an elongated rod that extends through the tubing member associated with said wheel, and wherein a pair of hinges is used to couple said leg support with one of said first and said second sections, each said hinge having a protrusion extending therefrom, said protrusion positioned to contact said rod and deploy said wheel when said second section is in said storage position, said protrusion being further positioned to be spaced from said rod when said second section is in said extended position, allowing said wheel to retract within said tubing member.

* * * * *